J. B. Hayden,
Door Spring.
No. 104,027. Patented June 7, 1870.
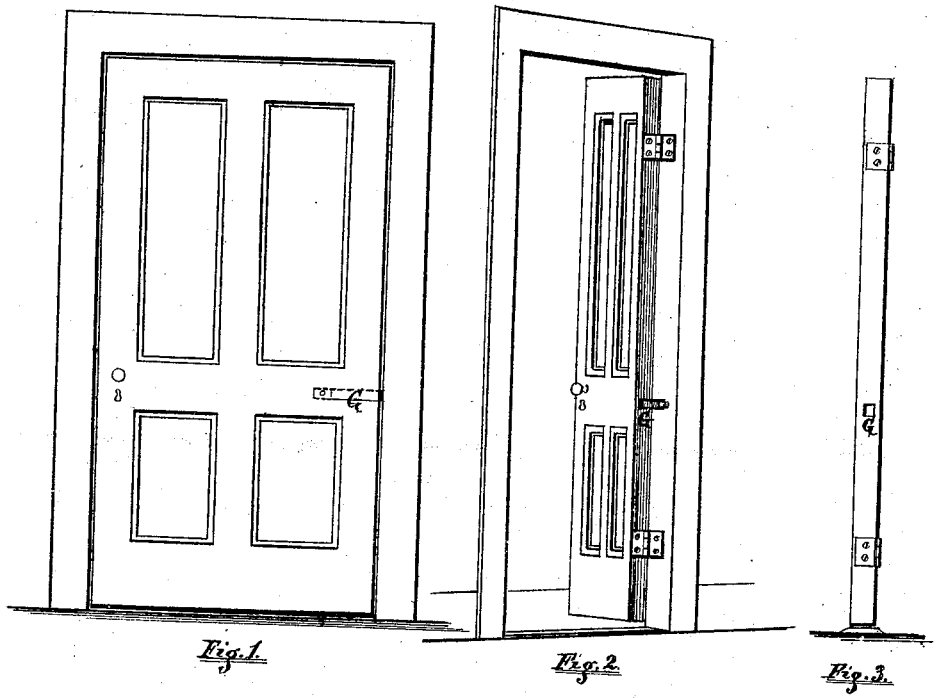
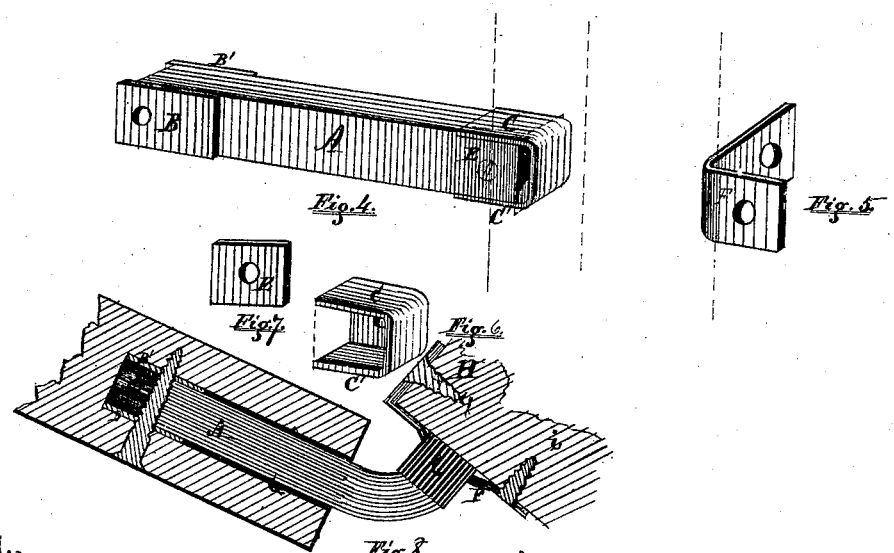

United States Patent Office.

JOEL B. HAYDEN, OF SCHAGHTICOKE, NEW YORK.

Letters Patent No. 104,027, dated June 7, 1870.

IMPROVEMENT IN RUBBER DOOR-SPRINGS.

The Schedule referred to in these Letters Patent and making part of the same.

*To all whom it may concern:*

Be it known that I, JOEL B. HAYDEN, of Schaghticoke, in the county of Rensselaer and State of New York, have invented a new and useful Improvement in Rubber Springs for Doors and Gates, called Hayden's Rubber Spring, of which the following is a full and exact description, reference being had to the accompanying drawings forming part of these specifications, and in which—

Figure 1 shows the position of the rubber spring inside of the door when the door is closed.

Figure 2 shows the action of the spring when the door is open, and the tendency of the tension to bring it shut and hold it.

Figure 3 represents the mortise in the back part of the door, for the admission of the spring.

Figure 4 is the rubber spring, with requisite fastenings.

Figure 5 is a flanged slide, to fasten the spring to the door-casing.

Figures 6 and 7 represent the requisite fastenings to secure the spring.

Figure 8 shows the whole complete, and the action of the spring while undergoing tension.

The invention consists in the combination of a rubber spring with the means, to be hereinafter described, for fastening the same to the door and door-frame.

In order that others skilled in the art to which my invention appertains may be enabled to make and use the same, I will proceed to describe it in detail.

In the drawings, fig. 3—

The mortise G is made in the back part of the door, for the insertion of spring $a$, fig. 4, which is made of vulcanized rubber, and held to its place in the door by passing a screw through the door, and taking the screw-holes in the metal pieces B B', fig. 4, thus fastening it securely in the door.

The other end is fastened by means of a piece of metal, with flanged sides, C C', fig. 6, and slot D, fig. 4.

The rubber is placed between the flanges C C', and the flat piece E, fig. 7, placed on it, so that, when compressed, it sinks between flanges C C', and is secured by a screw or rivet passing through piece E and the bottom piece in fig. 6, thus holding it secure.

After the rubber spring is inserted in the door and fastened, as described, the slide F, fig. 5, is put through the slot D, fig. 4, as shown in fig. 8, and fastened to the casing, by screws H and $i$, as in fig. 8, in the following manner:

After the flanged slide F is put through slot D, the door is closed, and the slide F driven into the casing until the flange comes to its place on the outside of the casing, and is secured by screw H, fig. 8. Then open the door, and insert screw $i$, fig. 8, and the fastening will be complete and strong.

Having thus described my invention,

What I claim as new, and desire to secure by Letters Patent, is—

In combination with the rubber spring A, the plates B B', for fastening the spring to the door at one end, and the flanged plate C and plate F, for fastening it to the jamb of the door-frame at the other end, substantially as described.

JOEL B. HAYDEN. [L. S.]

Witnesses:
ALPHONZO MERRELL,
SIDNEY S. CONGDON.